(12) United States Patent
Strömberg (10) Patent No.: US 11,781,615 B2
(45) Date of Patent: Oct. 10, 2023

(54) INSTRUMENT MOUNT MOVABLE PLATFORM COMPRISING SUCH INSTRUMENT MOUNT AND USE OF SUCH INSTRUMENT MOUNT

(71) Applicant: DST Control AB, Linköping (SE)

(72) Inventor: Jan-Erik Strömberg, Linköping (SE)

(73) Assignee: DST Control AB, Linköping (SE)

( * ) Notice: Subject to any disclaimer, the term of this patent is extended or adjusted under 35 U.S.C. 154(b) by 285 days.

(21) Appl. No.: 17/418,504

(22) PCT Filed: Dec. 20, 2019

(86) PCT No.: PCT/EP2019/086764
§ 371 (c)(1),
(2) Date: Jun. 25, 2021

(87) PCT Pub. No.: WO2020/136129
PCT Pub. Date: Jul. 2, 2020

(65) Prior Publication Data
US 2022/0074464 A1      Mar. 10, 2022

(30) Foreign Application Priority Data
Dec. 28, 2018   (EP) .................................. 18445001

(51) Int. Cl.
*F16F 15/08* (2006.01)
*F16F 3/02* (2006.01)
(Continued)

(52) U.S. Cl.
CPC .............. *F16F 15/085* (2013.01); *F16F 3/02* (2013.01); *F16F 3/093* (2013.01); *F16M 13/02* (2013.01); *F16F 2228/007* (2013.01)

(58) Field of Classification Search
CPC .. F16F 15/085; F16F 3/02; F16F 3/093; F16F 228/007; F16M 13/02
(Continued)

(56) References Cited

U.S. PATENT DOCUMENTS

| 2012/0316675 A1 | 12/2012 | Urano |
| 2012/0316685 A1* | 12/2012 | Pettersson ............ G03B 15/006 248/560 |
| 2013/0105619 A1* | 5/2013 | Buscher ................. B64D 47/08 396/428 |

FOREIGN PATENT DOCUMENTS

JP         2017013767 A      1/2017

OTHER PUBLICATIONS

International Search Report for International Application No. PCT/EP2019/086764, dated Jan. 29, 2020 (2 pages).
E-Space net English abstract for JP 2017013767 A.

* cited by examiner

*Primary Examiner* — Todd M Epps
(74) *Attorney, Agent, or Firm* — Kagan Binder, PLLC (57) ABSTRACT

The present disclosure provides a mount (1) for mounting an instrument to a movable platform. The mount comprises a base part (11), attachable to the platform, an instrument part (12), to which the instrument is attachable, and a spring and damper arrangement (14, 15) operable between the base part (11) and the instrument part (12) to allow the instrument part (12) to move relative to the base part (11). The mount further comprises first and second lever sets (13, 13a, 13b, 13c), each lever set comprising at least two parallel and spaced apart levers (131), which are rigidly connected to each other and which are pivotably connected to one of the base part (11) and the instrument part (12). The lever sets (13, 13a, 13b, 13c) are pivotable about respective first and second geometric axes, which are non-parallel with each other. The
(Continued)

lever sets are pivotable about a respective proximal portion (131*p*) of the lever (131). A distal portion (131*d*) of each of the levers (131) is connected to the other one of the base part and the instrument part by a respective elongate flexible member (14) presenting internal hysteresis. The disclosure also provides a movable platform comprising such mount and use of such mount for mounting an instrument to a movable platform.

19 Claims, 10 Drawing Sheets

(51) Int. Cl.
  *F16F 3/093* (2006.01)
  *F16M 13/02* (2006.01)
(58) Field of Classification Search
  USPC ......................................................... 248/591
  See application file for complete search history.

INSTRUMENT MOUNT MOVABLE PLATFORM COMPRISING SUCH INSTRUMENT MOUNT AND USE OF SUCH INSTRUMENT MOUNT

CROSS-REFERENCE TO RELATED APPLICATIONS

This application claims priority to International Application No. PCT/EP2019/086764, filed Dec. 20, 2019 and titled "INSTRUMENT MOUNT MOVABLE PLATFORM COMPRISING SUCH INSTRUMENT MOUNT AND USE OF SUCH INSTRUMENT MOUNT," which in turn claims priority from a European Patent Application having Ser. No. 18/445,001.3, filed Dec. 28, 2018, titled "INSTRUMENT MOUNT MOVABLE PLATFORM COMPRISING SUCH INSTRUMENT MOUNT AND USE OF SUCH INSTRUMENT MOUNT," both of which are incorporated herein by reference in their entireties.

TECHNICAL FIELD

The present invention relates to a mount for instruments, such as cameras, laser range finders, antennae, gas detectors, radars and other types of sensitive sensors. Furthermore, such sensors may be installed in a gimballed arrangement allowing the sensors to change pointing direction with respect to the mount.

The mount finds particular application for mounting instruments on movable platforms, such as aerial vehicles, but also for mounting instruments on a movable or vibrating part of a fixed structure, such as on a weak mast or the like.

BACKGROUND

When mounting instruments on e.g. aerial vehicles, and in particular helicopters or other rotary wing aircraft of manned or unmanned type, a substantial amount of potentially harmful and/or negatively performance affecting vibrations may be transferred from the vehicle to the instrument. Similar problems arise when mounting an instrument to a flexible but fixed structure, such as a weak mast or the like.

In order to reduce the amount of vibration energy transferred to the instrument, mounts with arrangements for dampening the vibration movement can be used.

Known such mounts comprise a base part that is to be attached to a fuselage of the aerial vehicle and an instrument part to which the instrument is attached. To reduce the amount of vibration energy transferred from the base part to the instrument part, and to maintain a desired position of the instrument part/interface, a number of elastic elements, e.g. springs are used between the two. For the energy transfer to be minimized, the elastic elements between the two parts/interfaces need to also dissipate energy. Therefore, springs are normally complemented by damper elements of some sort.

A problem with the mount as described above is that when the instrument is subjected to forces perpendicular to the instrument's direction of protrusion from the fuselage, e.g. as a consequence of wind forces or accelerations, the orientation of the instrument relative to the fuselage may change. That is, the instrument may tilt relative to the fuselage. This may cause the instrument to collide with adjacent structures or to provide incorrect data in those cases where the orientation of the instrument relative to the fuselage is critical. Another inherent problem with a mount such as described above is that vibrations in the horizontal direction may cause the instrument arrangement to enter into an uncontrolled pendulum motion, in particular in those cases when the center of gravity of the sensor arrangement is far away from the base part.

Attempts have been made to remedy this problem by providing various roll-stabilizing arrangements. However, known roll-stabilizing arrangements involve links which require bearing and ball joint arrangements. The problem with such a known arrangement is that the inherent friction introduced by the bearing and ball joints required for the motion of the rigid link arms, may contribute to transmission of vibration from the base part to the instrument part. Hence such an arrangement may entirely cancel out or at least significantly reduce the vibration attenuating properties of the mount.

The damaging effect of the friction is more severe the lighter the instrument arrangement is. Another problem with the described roll-stabilizing arrangement is that it is inherently prone to wear and sensitive to contamination from e.g. dust and dirt. If bearing and ball joints are sealed to tolerate dust and dirt, the friction will become even worse and become even more prone to wear.

One example of a prior art solution is disclosed in US20120316675A1, which forms the basis of the preamble of claim 1.

Hence, there is a need for an improved mount, and in particular a mount that reduces the tilting of the instrument part relative to the base part, and that is more robust against wear and contamination.

SUMMARY

It is an object of the present invention to provide a mount that eliminates or alleviates the above mentioned problems. A particular object is to provide a more robust mount, which is capable of counteracting instrument tilt.

The invention is defined by the appended independent claims. Embodiments are set forth by the appended dependent claims, in the following description and in the attached drawings.

According to a first aspect, there is provided a mount for mounting an instrument to a movable platform. The mount comprises a base part, attachable to the platform, an instrument part, to which the instrument is attachable, and a spring and damper arrangement operable between the base part and the instrument part to allow the instrument part to move relative to the base part. The mount further comprises first and second lever sets, each lever set comprising at least two parallel and spaced apart levers, which are rigidly connected to each other and which are pivotably connected to one of the base part and the instrument part. The lever sets are pivotable about respective first and second geometric axes, which are non-parallel with each other. The lever sets are pivotable about a respective proximal portion of the lever. A distal portion of each of the levers is connected to the other one of the base part and the instrument part by a respective elongate flexible member presenting internal hysteresis.

The base part is the part which is intended to be mounted to the structure that is to carry the mount. The instrument part is the part to which the instrument is to be mounted. Alternatively, the instrument part may be integrated with the instrument.

The term "flexible", in the context of the flexible member, should be understood to imply that the member is sufficiently flexible to allow it to be deformed as disclosed herein by such forces as will be relevant in the respective application. It is understood that the amount of such forces will vary depending on the weight and size of the instrument that the mount is adapted to carry, as well as external forces generated by the platform or by the motion of the platform (e.g. acceleration and wind forces).

In any event, the members will be more flexible, in the sense that they present lower (preferably much lower) bending stiffness, than the base part and the instrument part.

The base part and the instrument part can thus be regarded as rigid in the present application, in the sense that their flexibility is negligible. Likewise, the fact that the levers are rigidly connected to each other means that any the flexibility of the lever set is negligible.

The members may be elongated and have a substantially constant cross section over their respective length.

In particular, the members may present a thickness of 1-7 mm, preferably 2-6 mm and a length of 20-80 mm, preferably 30-70 mm.

Hence, a length to thickness ratio of each of the members may be in the range 3-80, preferably 4-70, 5-70, 10-40 or 15-30.

The flexible members should present internal hysteresis such that their bending and return movements are dampened.

In any event, each of the flexible members should present greater internal hysteresis than a solid metal rod having the same thickness.

The combination of lever sets and flexible members connecting the instrument and the base part will readily allow linear relative movement of the base part and the instrument part in directions which are parallel to a main plane of the base member and in a direction perpendicular to the main plane of the base member. However, movements causing the relative orientations of the instrument part and the base part to change, such as those incurred by a torque applied to the instrument part about an axis parallel with the main plane of the base member, will be counteracted.

Moreover, the fact that the flexible members present hysteresis will provide absorption of vibrations and dampen the relative movements between the base part and the instrument part.

Hence, while the mount will allow some relative movement between the base part and the instrument part, it will counteract movements that are particularly undesirable and it will provide dampening of vibrations.

The flexible members may have a thickness of 1-7 mm, preferably 2-5 mm.

The flexible members may have a length of 20-80 mm, preferably 30-70 mm.

At least one of the flexible members may comprise at least one of a plurality of metal filaments, at least one rubber elastic polymer member and at least one reinforced polymer member.

For example, the member may be formed by a metal wire, a reinforced polymer member, such as a rod or tube, an elongated rubber member, such as a rod or tube, or a hybrid comprising one or more metal filaments, polymer/metal wires or filaments, tubes or rods.

The axes may present a mutual angle between 45 and 135 degrees, preferably 45-75 degrees.

The number of lever sets may be 2-6, preferably 3-5 or 3-4.

The mount may further comprise at least one biasing member configured to bias the instrument part and the base part towards a predetermined mutual position.

In particular, the predetermined mutual position may be determined based on the weight of the instrument that is to be carried by the mount, such that the mount, in an equilibrium/static will provide a predetermined relative position of the base part and the instrument part.

For example, the biasing member may be configured to bias the instrument part towards the base part.

The mount may further comprise at least one position limiter arranged on one of the base part and the instrument part, wherein the other one of the base part and the instrument part is biased towards the position limiter.

At least one of the levers may be connected to each other by an axle, which is pivotably connected to said one of the base part and the instrument part.

At least one of the levers may be pivotably connected to a lever base by respective pin members.

The lever set may be connected to said one of the base part and the instrument part by at least one set of crossed spring blades.

The advantage of this particular arrangement is that it is completely free from friction and wear. It is also inherently insensitive to contamination by selection of proper materials. In this arrangement, all sliding motion between parts (except for the deliberate motion inside the flexible members when bending) have been fully eliminated.

The spring blades of a lever set may be arranged in an X-configuration, with the axis of the lever set substantially coinciding with the junction of the X configuration. However, a slight displacement of the position of the axis may take place.

According to a second aspect, there is provided a movable platform, comprising a platform body, an instrument, and an instrument mount as disclosed above, wherein the instrument is mounted to the platform body by means of the mount.

The instrument may comprise at least one of gimbal, a camera, a laser range finder, an antenna, a gas detector and a radar transmitter/detector a camera.

The movable platform may be an aerial vehicle.

The movable platform may be a weak mast.

According to a third aspect, there is provided use of a mount as disclosed above, for mounting an instrument to a movable platform.

In the use, the instrument may comprise at least one of gimbal, a camera, a laser range finder, an antenna, a gas detector and a radar transmitter/detector.

In the use, the platform may be an aerial vehicle.

In the use, the platform may be a weak mast.

DETAILED DESCRIPTION

Figure 1:
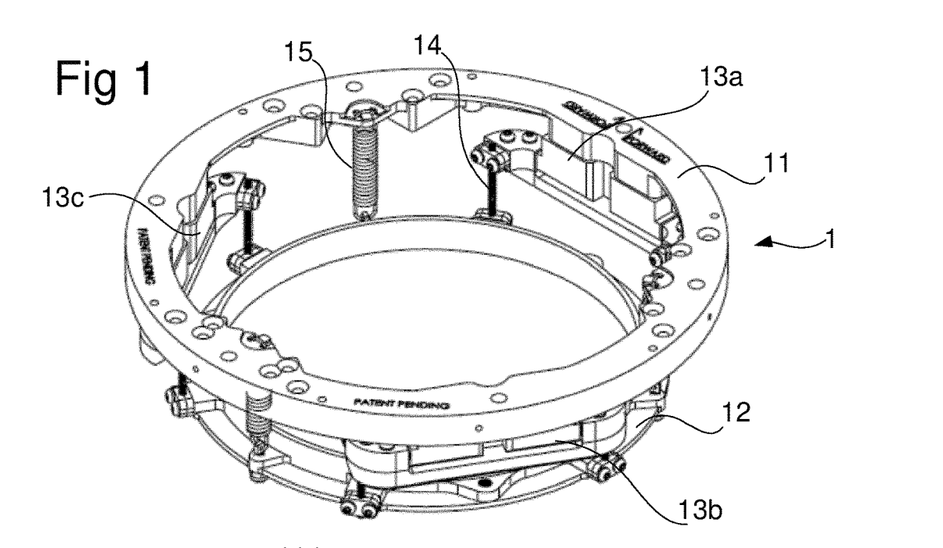
FIG. 1 is a schematic perspective view of an instrument mount.

Referring to FIG. 1, there is illustrated an instrument mount 1, comprising a base part 11 and an instrument part 12. In the illustrated example, the parts 11, 12 are shown as essentially coaxially arranged annular parts with generally circular outlines. As illustrated, the parts may have respective central openings, which also may be generally circular.

However, it is understood that the concepts disclosed herein are equally applicable to base and/or instrument parts having other outline shapes, such as generally square, generally rectangular, generally polygonal, generally elliptic, etc.

The base part 11 may have a substantially planar surface facing the structure carrying the mount. This planar surface defines a main plane of the base part. A direction perpendicular to the main plane is defined as an axial direction of the mount. Directions perpendicular to the axial direction are defined as radial directions.

The base part 11 as well as the instrument part 12 may be produced from a lightweight metal or metal alloy, such as aluminum or titanium alloys, or from or glass or carbon reinforced plastics, or even thermoplastics of suitable quality and stiffness. Non-limiting example production methods include casting and various additive manufacturing techniques.

The parts 11, 12 may present a generally L-shaped profile. In particular, the base part 11 may be designed with an upside-down L-profile, with a horizontal part 111 forming the planar surface and the vertical part 112 forming an outermost rim of the base part 11. The instrument part 12 may be formed with an L-shaped profile wherein the vertical part 122 forms an inwardly facing part of the annular frame and with the horizontal part 121 forming a downwardly facing surface.

Both parts 11, 12 may be provided with a plurality of reinforcements 113, 114; 124, 125, 126, which may provide for attachments for the components that will be discussed below.

It is moreover understood that one, or both, of the parts 11, 12 may be formed without any central opening.

The mount as illustrated comprises three lever sets 13a, 13b, 13c, each lever set comprising a pair of effectively parallel levers 131.

In the illustrated example, the lever sets 13a, 13b, 13c are arranged on the base part 11. However, it is understood that lever sets 13a, 13b, 13c may instead be arranged on the instrument part 12.

The lever sets 13a, 13b, 13c are pivotable about a respective geometric axis provided approximately at a proximal portion 131p of the respective lever 131.

The proximal portion of the levers coincides with the geometric axis about which the levers are rotatable.

The geometric axes are non-parallel with each other. For example, with two axes, the axes may be perpendicular. With three axes, the axes may present mutual angles of about 60 degs. With four axes, the axes may be arranged on the sides of a square. With five axes, the axes may be arranged on the sides of an equilateral pentagon, etc.

The levers 131 forming part of a lever set 13a, 13b, 13c are rigidly connected to each other, such that the levers' pivot positions, but for deflection of the connector member 132 connecting the levers, will always be the same. Hence, the connector member 132 connecting the levers should be designed so as not to deform at the loads for which the system is designed. That is, the amount of the deformation should be negligible for the forces that the connector member 132 will normally be subjected to.

At distal portions 131d of the levers 131, each lever 131 is connected to the instrument part 12 by a respective elongate flexible member 14 presenting internal hysteresis.

Each of the flexible members 14 may be formed by a metal multifilament wire, by a flexible rod, or by a flexible tube. In the case of a rod or tube, the flexible member 14 may be formed of a polymeric material, such as a rubber elastic material. Moreover, composite materials are possible, such as fiber reinforced polymeric materials. Also composite members are plausible, i.e. wires containing a plurality of filaments made from different materials.

The members 14 should be sufficiently flexible to allow elastic bending, such that the instrument part 12 may move in directions parallel to a plane of the base part 11.

Moreover, the members 14 should be sufficiently rigid to counteract tilting of the instrument part 12 relative to the base part. In particular, the members should be able to withstand a sufficiently high compressive force in the longitudinal direction.

Finally, the members 14 should present internal hysteresis such that bending movements result in energy dissipation and thus are effectively dampened.

In embodiments successfully tested, stainless steel metal multifilament wires having a thickness of 2-4 mm have proven useful, at least for instruments in a mass range of 1-15 kg.

In each lever set 13, 13a, 13b, 13c, the levers 131 are spaced from each other. Generally, it is preferred that the levers are spaced as far as possible from each other. For example, a spacing of the levers may be on the order of 25-75% of a greatest footprint dimension of the base member 11. For example, when the base member 11 is generally annular, the lever spacing may be on the order of 25-75% of an outer diameter of such annulus.

In some practical embodiments, the levers may be spaced by some 50-200 mm, preferably 100-200 mm.

The mount may further comprise one or more biasing springs 15 with the purpose of carrying the mass (gravitational forces) of the instrument at rest. In the illustrated embodiment, such biasing springs 15 may be arranged to bias the base part 11 and the instrument part 12 towards a predetermined relative position. To this end, the springs 15 may be formed by helical springs operating in tension mode.

Figure 2:
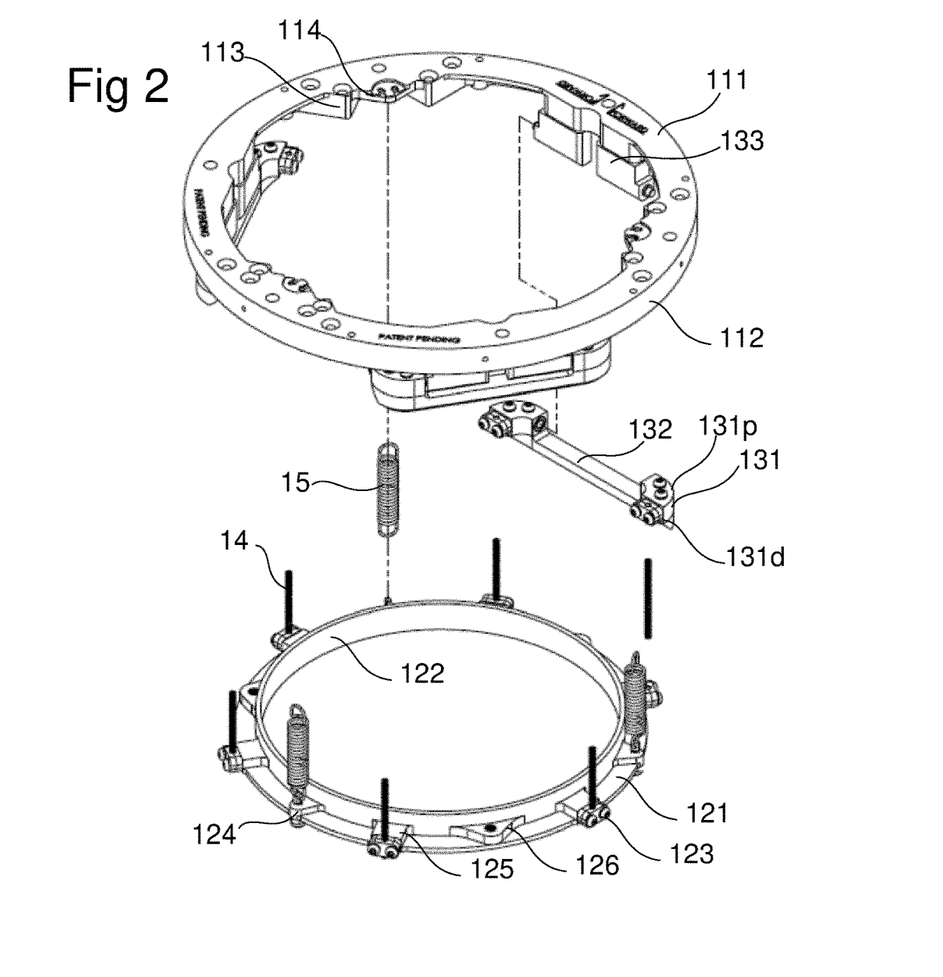
FIG. 2 is a schematic exploded perspective view of the instrument mount in FIG. 1.

Referring to FIG. 2, there is illustrated an exploded view of the instrument mount 1 of FIG. 1. In this exploded view, one of the lever sets 13a has been disconnected from a lever set base 133. Moreover, two of the biasing springs 15 have been disconnected from the base and a third biasing spring 15 has been disconnected altogether. Five of the members 14 have been disconnected from their associated levers 131 with a sixth members 14 having been disconnected altogether.

Figure 15A:
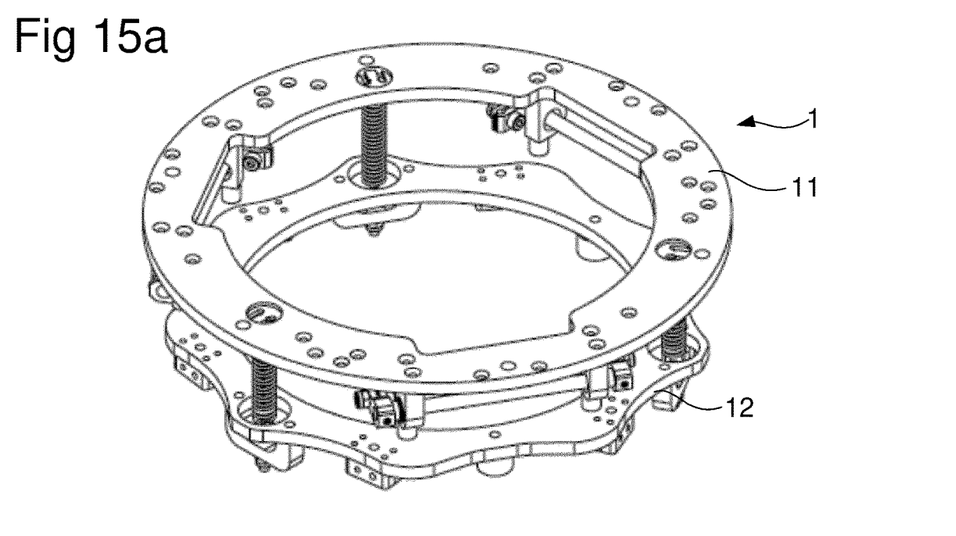
FIGS. 15a-15b are schematic perspective view of yet another embodiment of an instrument mount, in an assembled and an exploded state, respectively.
Figure 15B:
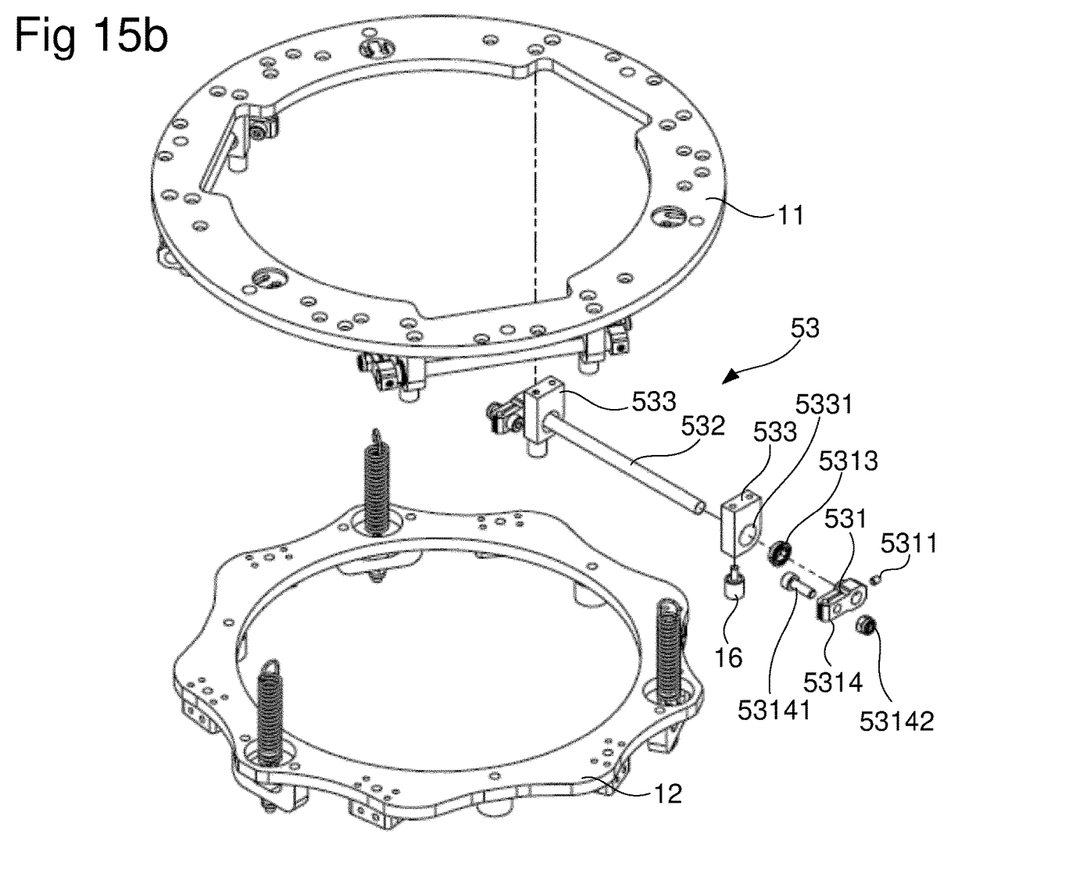

As can be seen in FIG. 2, the members 14 can be connected to the instrument part 12 by means of clamps 123, with each clamp comprising a pair of clamping members and one or more screws or bolts to force the clamping members together. A groove may be provided for receiving the member 14. Other clamping arrangements may also be used as illustrated in FIG. 15a-15b.

Corresponding clamps 1314 may be provided at the distal portions 131d of the levers 131.

The springs 15 may be attached to the parts 11, 12 by means of e.g. lugs or the like. Such lugs may be provided at reinforced portions 114, 124 of the respective part 11, 12.

Figure 3:
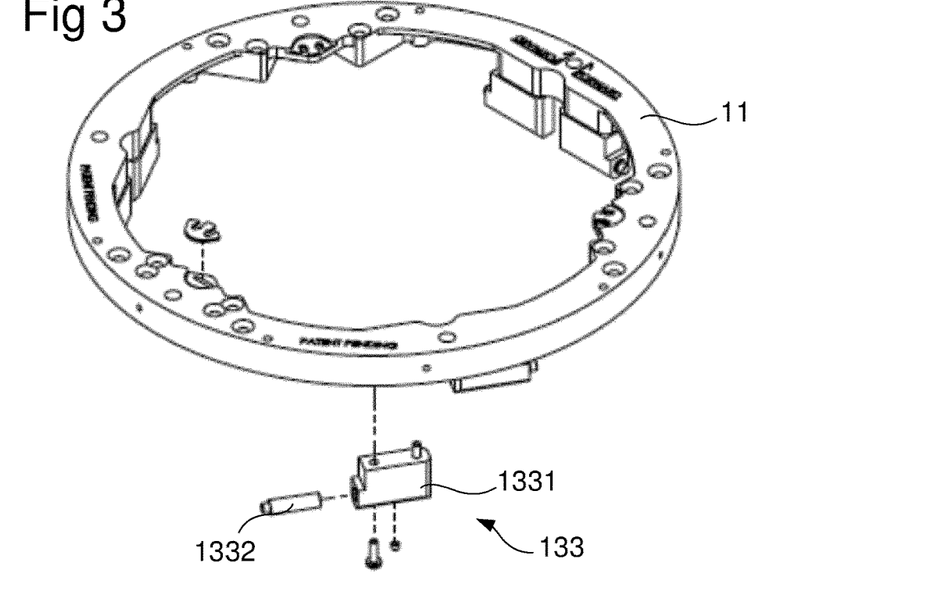
FIG. 3 is a schematic exploded perspective view of a hinge part of the instrument mount in FIGS. 1 and 2.

Referring to FIG. 3, the lever set base 133 may comprise a base body 1331 and an axle 1332, which may be insertable in the base body 1331. The axle 1332 may be fixable relative to the base body 1331.

The base body 1331 may, in turn, be connected to the base part 11, or to the instrument part 12, as the case may be.

The lever base 133 may be connected to the associated part 11, 12, which in the illustrated example is the base part 11, at a reinforcement 113 provided in the part. For example, such reinforcement 113 may be provided by a portion of the base part 11 having greater material thickness. The reinforcement may be provided with holes or recesses, which may be threaded, to allow mounting of the lever set base 133 by means of e.g. screws or bolts.

Figure 4A:
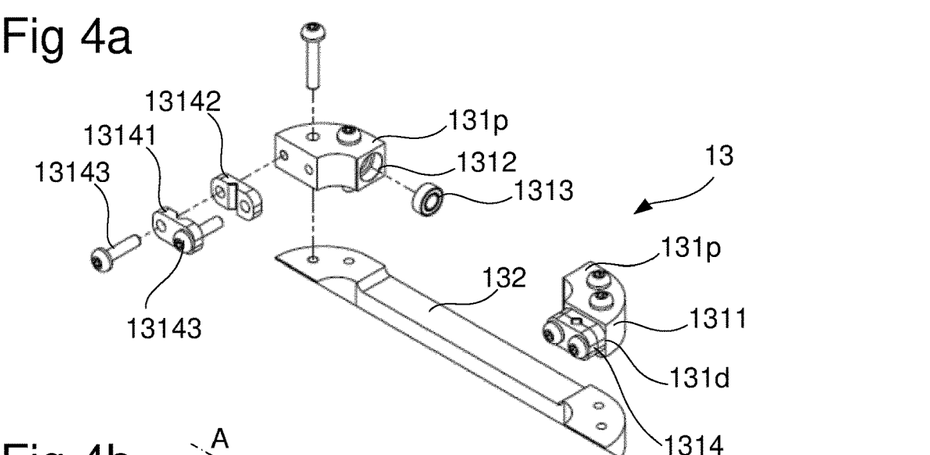
FIGS. 4a-4b are schematic exploded and assembled perspective views of a lever set for use in the instrument mount in FIGS. 1 and 2.
Figure 4B:
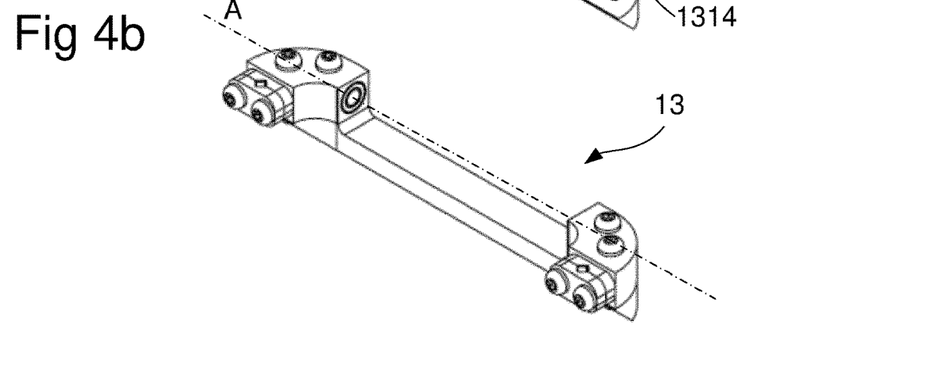

Referring to FIGS. 4a-4b, there is further illustration of the lever set 13a, 13b, 13c. In this embodiment, the lever set is formed by a connector member 132, which connects a pair of lever forming members 1311.

The lever forming members 1311 may comprise a respective recess 1312 for receiving a respective bearing 1313, by which the axle 1332 may be engaged. The recesses may be open towards a direction that is parallel, and preferably coaxial with an axis A, about which the lever set 13 is pivotable.

In the illustrated example, clamps 1314, comprising at least one clamp member 13141, 134142 and at least one faster 13143 are provided and connected to distal portions 131d of the lever forming members 1311.

While, in the illustrated example, the clamps 1314 may comprise a pair of clamp members 13141, 13142, each comprising a respective groove for receiving the members 14, a single clamp member may be sufficient, with the lever forming members providing the other clamp member.

The clamps may be connected to the associated part 11, 12, which in the illustrated example is the instrument part 12, at reinforced portions 125 formed in the part 12. Again, such reinforced portions may be provided as portions of material thickness that is greater than surrounding portions. Such reinforced portions may be provided with holes or recesses, which may be threaded so as to facilitate mounting by means of threaded members, such as screws or bolts.

The function of the mount 1 will now be explained with reference to FIGS. 5a-5c, 6a-6b and 7a-7b.

Figure 5A:
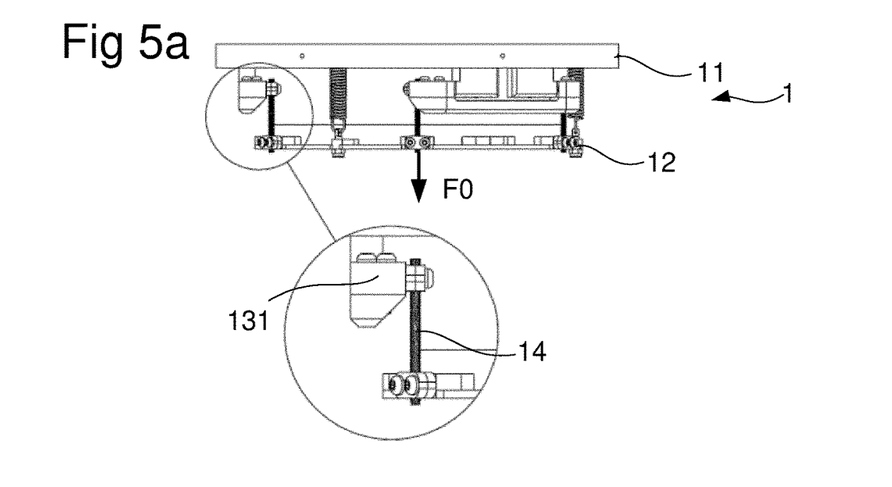
FIGS. 5a-5c schematically illustrate the mount when subjected to an axial load.
Figure 5B:
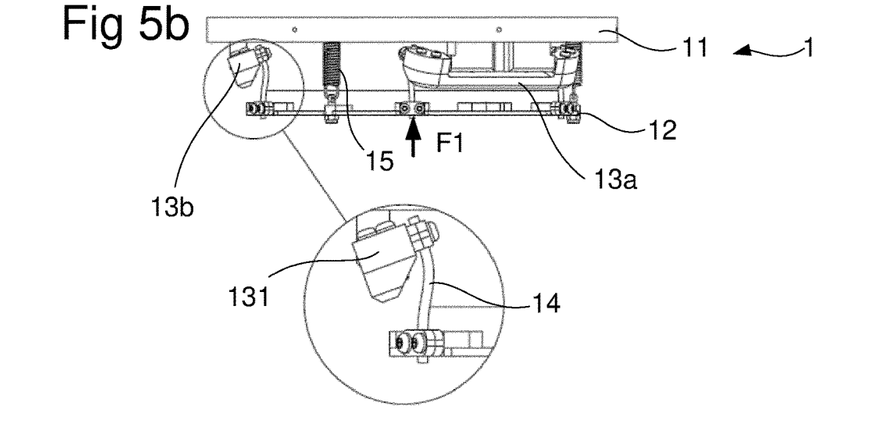
Figure 5C:
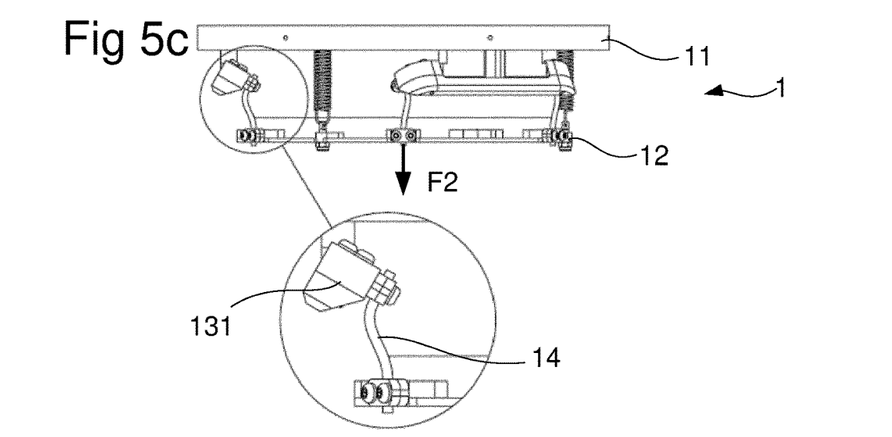
Figure 6A:
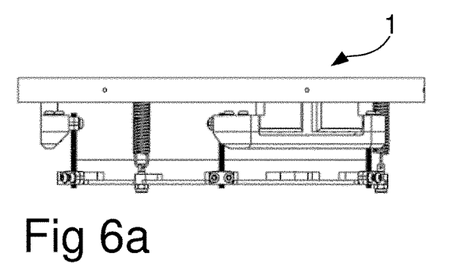
FIGS. 6a-6b and 7a-7b schematically illustrate the mount when subjected to a radial load.
Figure 6B:
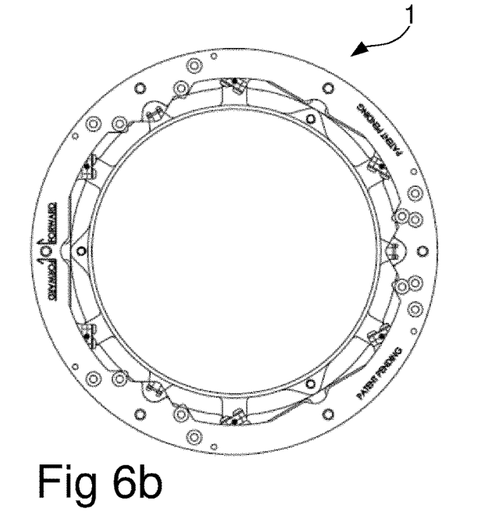
Figure 7A:
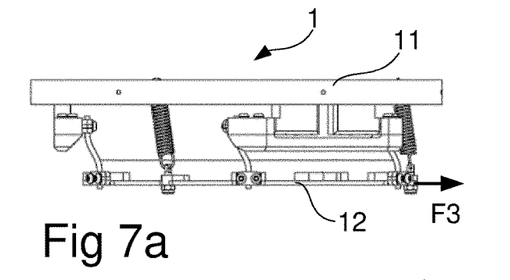
Figure 7B:
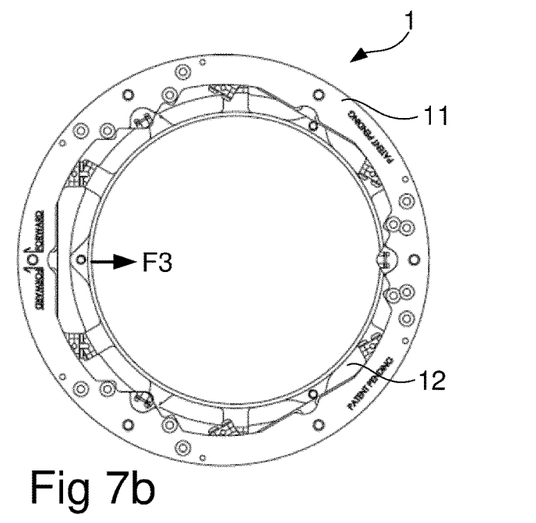

For FIGS. 5a, 5b and 5c it is assumed that the instrument is mounted to the instrument part 12. The instrument is not shown to simplify the drawings.

FIG. 5a schematically illustrates the mount in a non-loaded state, where both the base part 11 and the instrument part 12 are horizontally oriented. In this state, the biasing springs 15 are biasing the instrument part 12 towards the base part 11, so that the instrument part 12 is in its equilibrium position, i.e. a position where the instrument is mounted (thus exerting force F0 on the mount), but wherein both the platform and the instrument are stationary. As can be seen in the enlarged portion of FIG. 5a, the springs 15 are slightly extended and the levers 131 extend approximately horizontally and the members 14 are straight and vertical. It is noted that the springs 15 may be selected based on instrument mass, so that this equilibrium position (in which the load carried by the flexible members is negligable) will be achieved.

Due to the cantilevered connection of the wires, the wire will become slightly bent in this position.

FIG. 5b schematically illustrates the mount in a negatively axially loaded state, where a vertically upwardly acting force F1 is applied to the instrument part 12. The force can result from an inertial force provided by an instrument mounted to the instrument part 12, in connection with an acceleration of the platform or by vibrations.

FIG. 5c schematically illustrates the mount in a positively axially loaded state, wherein a downwardly acting force F2 is applied to the instrument part 12. Again, this force can be due to vibrations and/or accelerations of the platform, as described previously. As can be seen in FIG. 5c, the springs 15 have been further extended and the levers 131 are now pointing slightly downwardly. The relative movement between the base part 11 and the instrument part 12 is limited by the members 14.

It is noted that the relative axial movement between the base part 11 and the instrument part 12 causes all lever sets 13a, 13b, 13c to pivot equally due to the flexible members restricting the motion accordingly. Hence the base and the instrument interfaces will remain approximately parallel under all such vertically acting forces.

It is noted that the movement between the positions illustrated in FIGS. 5a-5c will effectively be dampened by the internal hysteresis provided by the members 14.

Hence, the relative axial movement between the base part 11 and the instrument part 12 is a dampened movement.

FIGS. 6a-6b and 7a-7b schematically illustrates the mount when subjected to a force F3 operating in the radial direction, i.e. perpendicular to the forces F1, F2 and thus horizontally as seen in the drawings.

When the force F3 is applied to the instrument part 12, the instrument part 12, due to the flexibility of the members 14 and of the springs 15, will move horizontally, and in a direction parallel with a plane of the base member. That is, the constant length of the members causes the instrument part 12 to move as a parallelogram relative to the base part 11, thus limiting the motion of the instrument part with respect to the base part so that the two remain essentially parallel.

Again, the bias from the springs 15 and the dampening and elastic effect of the members 14 will operate to dampen the relative movement between the instrument part 12 and the base part 11.

Hence, referring to FIGS. 5a-5c, 6a-6b and 7a-7b, it is clear that the mount readily allows relative axial and radial movements between the instrument part 12 and the base part 11, while at the same time effectively hindering/attenuating any pendulum movement. This is achieved without adding any damaging frictions such as that caused by ball joints in a conventional roll-stabilizing arrangement. Also, the flexible members are inherently tolerant against contamination and wear by selecting proper materials.

Figure 8:
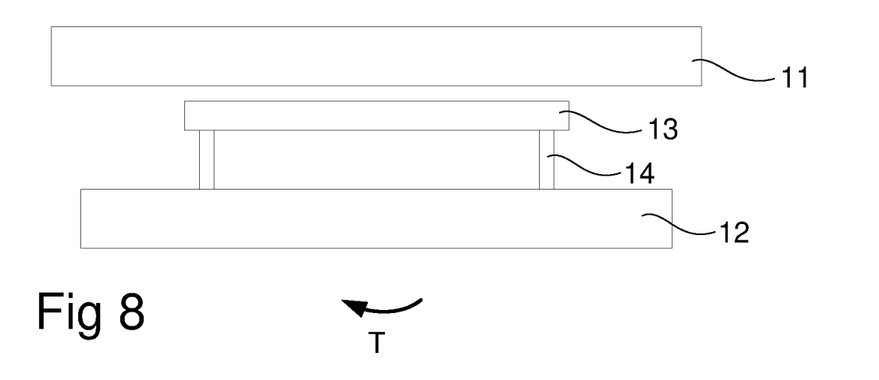
FIG. 8 schematically illustrates the mount when subjected to a torque about a horizontal axis.

Hence, referring to FIG. 8, if the mount is subjected to a torque T, acting about a horizontal axis as seen in the drawings, then pairs of levers and members 14 forming each lever set 13 will effectively counteract any tilting of the instrument part 12 relative to the base part 11, due to the stiffness of the members 14.

Figure 9:
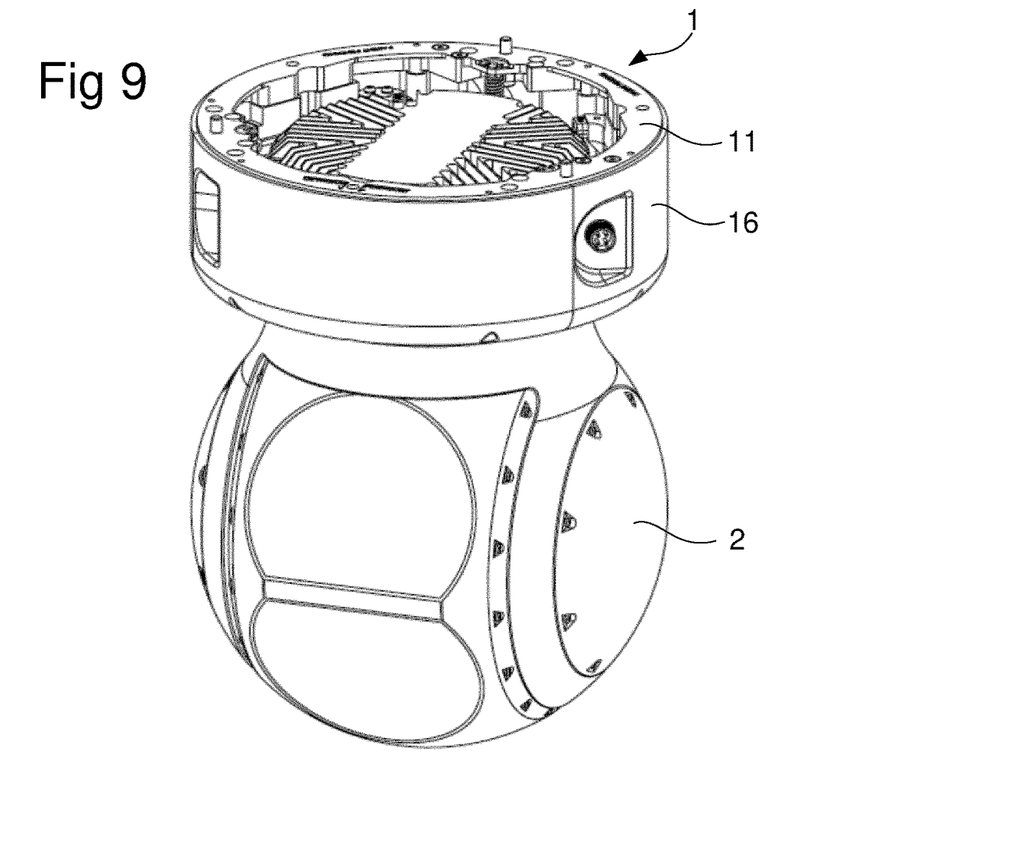
FIG. 9 is a schematic perspective view of an instrument mount and an instrument carried in the instrument mount.

Referring to FIG. 9, there is illustrated a mount 1, to which an instrument in the form of a gimballed camera 2 (which may be capable of remote controlled motion in two or more directions) has been attached. Moreover, the mount has been provided with a mount shroud 16. Mounting of the instrument to the instrument part 12 of the mount may be improved by providing reinforces portions 126 in the instrument part 12. Such reinforced portions may be provided with holes or recesses, which may be threaded so as to facilitate mounting by means of threaded members, such as screws or bolts.

Figure 10:
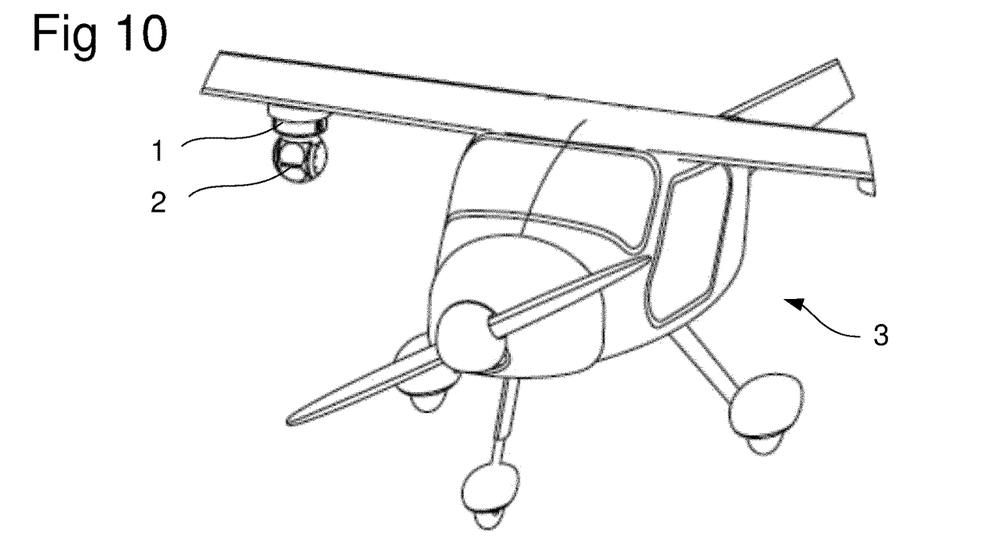
FIG. 10 is a schematic perspective view of an aerial vehicle carrying an instrument by means of an instrument mount.

Referring to FIG. 10, there is illustrated a mount 1 which is mounted under a wing of an airplane and which carries an instrument 2 in the form of a gimballed camera. Alternatively, the mount and the instrument carried by the mount may be mounted on an underside of a fuselage of an airplane, a helicopter or a drone.

It is noted that the mount typically is mounted with the base part 11 attached to an underside of the vehicle or other structure carrying it, and that the instrument part 12 is typically suspended vertically below the base part 11.

Figure 11A:
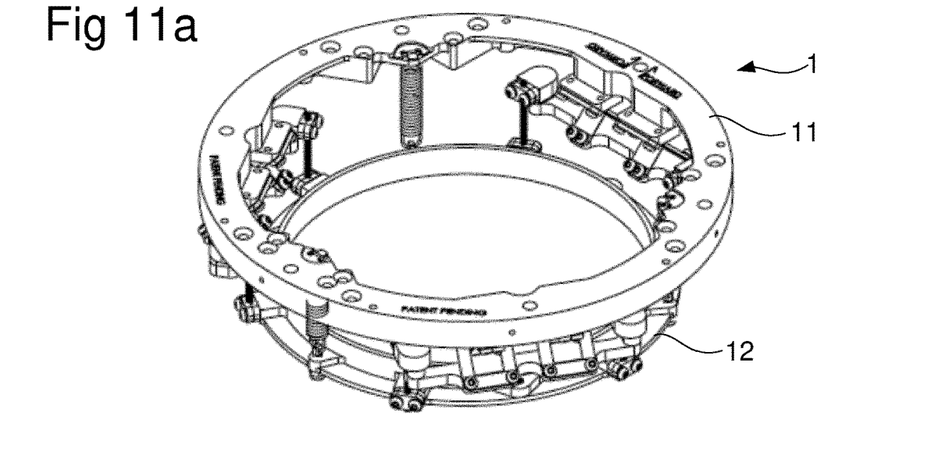
FIGS. 11a-11b are schematic perspective view of another embodiment of an instrument mount, in an assembled and an exploded state, respectively.
Figure 11B:
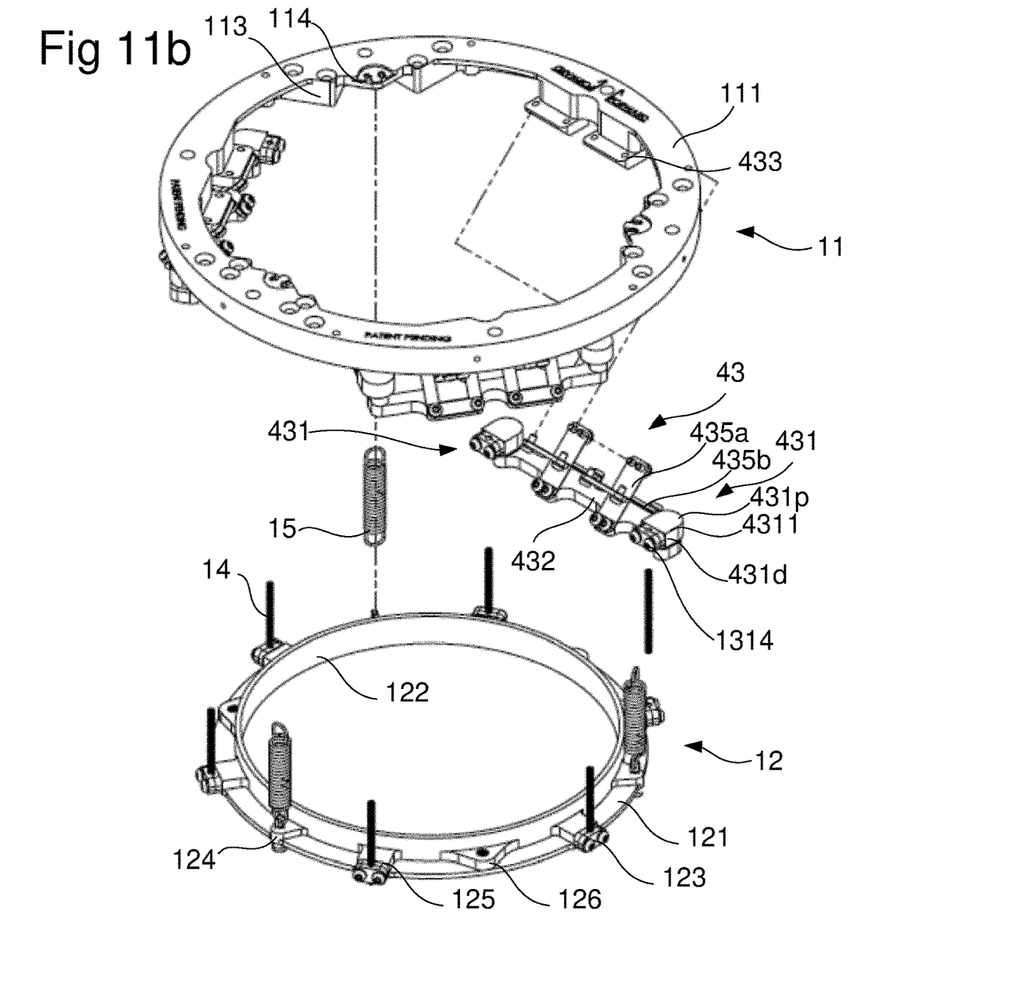

Referring to FIGS. 11*a*-11*b*, there is illustrated another embodiment of an instrument mount, in which the rigid shafts are rotating by means of cross arranged spring blades. FIGS. 11*a*-11*b* correspond to FIGS. 1-2, and so identical items have been given the same reference numerals. Reference is made to FIGS. 1-2 for description of such items.

The embodiment of FIGS. 11*a*-11*b*, 12*a*-12*c* and 13*a*-13*b* differs from that previously disclosed in the structure of the lever set 43.

The lever set comprises a pair of levers 431 formed by a respective lever body 4311 and a respective connecting member 432, which rigidly connects the levers 431. Moreover, a lever base 433 is provided for connection to the base member 11, in a manner similar to the base 133 disclosed above. Similar to the first embodiment, the levers 431 may present a respective proximal end 431*p* and a respective distal end 431*d*.

However, instead of providing axles and bearings, one or more sets of lever spring blades 435*a*, 435*b* is provided. Each set of spring blades comprises at least two elongate spring blades, which are arranged in an X configuration, such that main planes of the spring blades intersect at an angles of 90 degs+/−30 degs, preferably +/−15 degs, +/−5 degs or at right angles.

The spring blades may, as illustrated in FIG. 11*b*, each be formed by a single spring blade. The spring blades may be formed with recesses and/or holes so that the spring blades may laterally overlap each other.

Figures 12A, 12B, 12C:
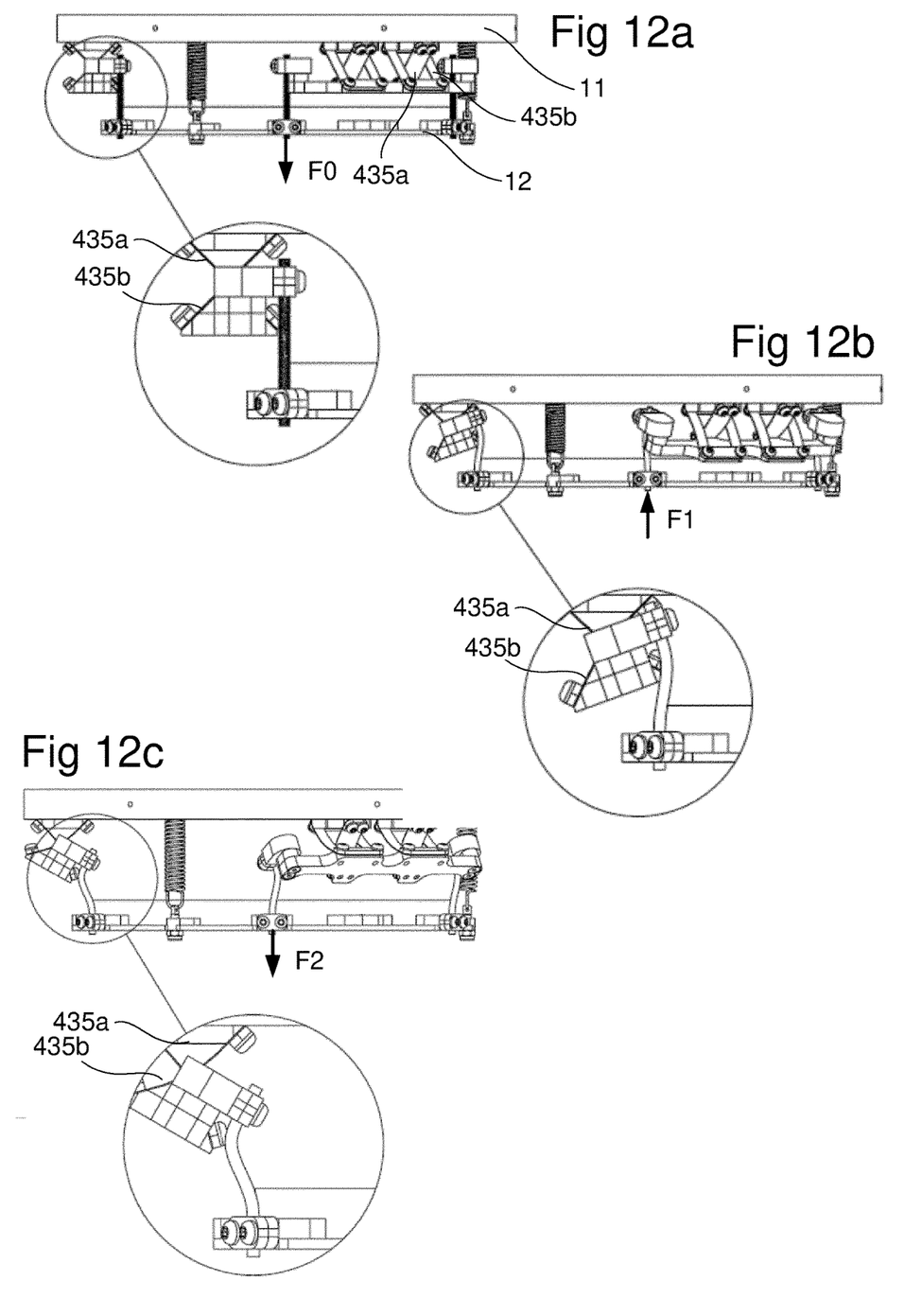
FIGS. 12a-12c schematically illustrate the instrument mount of FIGS. 11a-11b in various operating states.
Figure 13A:
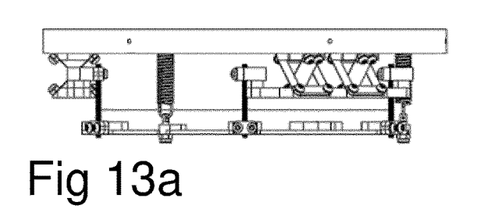
FIGS. 13a-13b and 14a-14b schematically illustrate the instrument mount of FIGS. 11a-11b in further operating states.
Figure 13B:
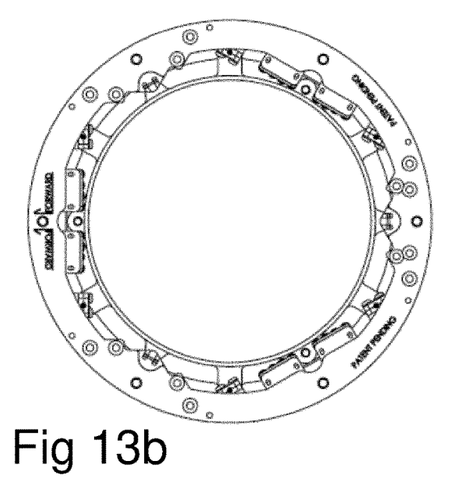
Figure 14A:
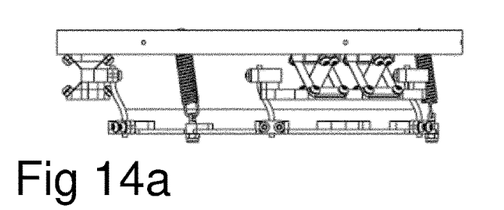
Figure 14B:
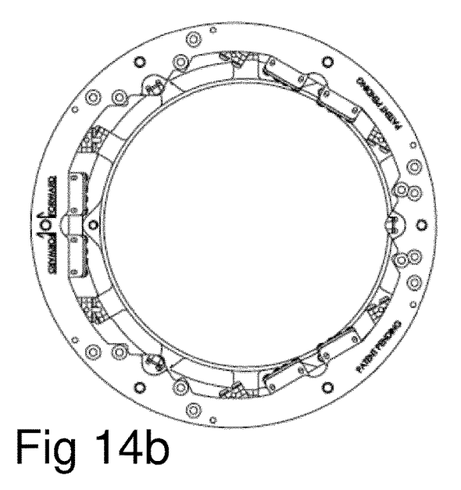

Alternatively, each spring blade may, as illustrated in FIG. 12*a*, be formed by two or more separate and spaced apart spring blades. In particular, each set of spring blades may be formed by one central blade extending in a first plane and a pair of peripheral spring blades extending in a second plane, perpendicular to the first plane and on opposite lateral sides of the central spring blade.

The spring blades may, as illustrated, be connected to the member 432 and to the lever base 433 by screws. Other attachments are possible, such as welding, riveting or snap arrangements.

It is possible to connect the lever set by means of a single spring blade or by a plurality of parallel spring blades.

Referring to FIGS. 12*a*-12*c*, the function of the embodiment disclosed in FIGS. 11*a*-11*b* will be described.

FIGS. 12*a*-12*c* correspond to FIGS. 5*a*-5*c*, respectively.

In FIG. 12*a*, it can be seen that the lever spring blades, in the static position, are substantially planar.

In FIG. 12*b*, in the vertically upwardly loaded case, the levers 431 have pivoted upwardly. To this end, both lever spring blades 435*a*, 435*b* have been bent so that they are radially outwardly convex.

Similarly, in FIG. 12*c*, in the vertically downwardly loaded case, the levers 431 have been pivoted downwardly, whereby the lever spring blades have been bent in the opposite direction, so that they are radially outwardly concave.

FIGS. 13*a*-13*b* and 14*a*-14*b* correspond to FIGS. 6*a*-6*b* and 7*a*-7*b*, respectively, and show the behavior of the mount when the instrument part is subjected to a radial load.

The function is the same as that of the first embodiment.

Referring to FIGS. 15*a*-15*b*, there is illustrated another embodiment of an instrument mount, in which the rigid shafts are based on standard cylindrical rods. FIGS. 15*a*-15*b* correspond to FIGS. 1-2, and so identical items have been given the same reference numerals. Reference is made to FIGS. 1-2 for description of such items.

The embodiment of FIGS. 15*a*-15*b* differs from that previously disclosed in the structure of the lever set 53.

In the embodiment disclosed in FIGS. 15*a*-15*b* comprises a pair of lever bases 533 for attachment to the base member 11. The lever bases preset a respective recess, herein the form of a through hole 5331, in which a respective bearing 5313 is received. An axle 532 is received in the bearings 5313 and at spaced apart portions of the axle 532 levers 531 are attached. The levers 531 may be releasably attached, e.g. by means of screws 5311, as illustrated. Other attachment arrangements may be used, such as splines, etc.

A clamp 5314 for connecting the flexible member 14 may be provided at the distal portion of the lever 531. The clamp may be activated by a nut 53141 and bolt 53142 arrangement, as illustrated.

At an axially distal portion of the lever bases 533, axial limiters 16 may be provided. The axial limiters may be provided with a softer material, e.g. to reduce impact, noise and/or wear.

With the levers 531 being rigidly attached to the axle 532, and flexible members 14 connected between the clamps 5314 and the instrument part 12, the functioning of this embodiment will be identical to that of the other embodiments disclosed herein.

Axial limiters 16 may alternatively be provided as separate members extending axially from one of the base part 11 or the instrument part 12. Moreover, it is possible to provide the axial limiter on an axially distal portion of the lever bodies 131.

It is noted that a combination of the different lever set concepts disclosed herein may be used, for example one of each lever set concept, two of each lever set concept, etc.

It is also noted that the flexible members 14 need to be selected and adapted for the load case of each specific application. For example, the material or material combination (pure material, alloys, composites, etc.), member configuration (number of filaments, filament materials, filament thicknesses, etc.), length and thickness of the members may be selected so as to provide sufficient axial rigidity, bending stiffness and hysteresis of the members 14.

The number of lever sets applied may be varied in order to fit different applications, and in particular different load cases.

The biasing members 15 will need to be selected to fit each load case, so that a desired static position can be achieved.

The invention claimed is:

1. A mount for mounting an instrument to a movable platform, the mount comprising:
   a base part, attachable to the platform,
   an instrument part, to which the instrument is attachable,
   a spring and damper arrangement operable between the base part and the instrument part to allow the instrument part to move relative to the base part, and
   first and second lever sets, each lever set comprising at least two parallel and spaced apart levers, which are rigidly connected to each other and which are pivotably connected to one of the base part and the instrument part,
   wherein the lever sets are pivotable about a respective proximal portion of the lever,
   wherein
   the lever sets are pivotable about respective first and second geometric axes, which are non-parallel with each other, and
   a distal portion of each of the levers is connected to the other one of the base part and the instrument part by a respective elongate flexible member presenting internal hysteresis.

2. The mount as claimed in claim 1, wherein the flexible members have a thickness of 1-7 mm, preferably 2-5 mm.

3. The mount as claimed in claim 1, wherein the flexible members have a length of 20 mm.

4. The mount as claimed in claim 3, wherein the flexible members have a length of 30 mm.

5. The mount as claimed in claim 1, wherein at least one of the flexible members comprises at least one of:
   a plurality of metal filaments,
   at least one rubber elastic polymer member, and
   at least one reinforced polymer member.

6. The mount as claimed in claim 1, wherein the axes present a mutual angle between 45 and 135 degrees.

7. The mount as claimed in claim 6, wherein the axes present a mutual angle between 45-75 degrees.

8. The mount as claimed in claim 1, wherein the number of lever sets is 2-6.

9. The mount as claimed in claim 8, wherein the number of lever sets is 3-6.

10. The mount as claimed in claim 8, wherein the number of lever sets is 3-5.

11. The mount as claimed in claim 1, further comprising at least one biasing member configured to bias the instrument part and the base part towards a predetermined mutual position.

12. The mount as claimed in claim 1, further comprising at least one position limiter arranged on one of the base part and the instrument part, wherein the other one of the base part and the instrument part is biased towards the position limiter.

13. The mount as claimed in claim 1, wherein the levers are connected to each other by an axle, which is pivotably connected to said one of the base part and the instrument part.

14. The mount as claimed in claim 1, wherein the levers are pivotably connected to a lever base by respective pin members.

15. The mount as claimed in claim 1, wherein the lever set is connected to said one of the base part and the instrument part by at least one set of crossed spring blades.

16. A movable platform, comprising:
   a platform body,
   an instrument, and
   an instrument mount as claimed in claim 1,
   wherein the instrument is mounted to the platform body by means of the mount.

17. The movable platform as claimed in claim 16, wherein the instrument comprises at least one of gimbal, a camera, a laser range finder, an antenna, a gas detector and a radar transmitter/detector.

18. The movable platform as claimed in claim 16, wherein the platform is an aerial vehicle or a weak mast.

19. A method of mounting an instrument to a movable platform comprising
   providing a mount as claimed in claim 1;
   attaching the base part of the mount to a movable platform; and
   attaching the instrument part of the mount to an instrument.

* * * * *

UNITED STATES PATENT AND TRADEMARK OFFICE
CERTIFICATE OF CORRECTION

PATENT NO. : 11,781,615 B2
APPLICATION NO. : 17/418504
DATED : October 10, 2023
INVENTOR(S) : Jan-Erik Strömberg Page 1 of 1

It is certified that error appears in the above-identified patent and that said Letters Patent is hereby corrected as shown below:

In the Claims

Claim 3, Line 30, of Column 11 "members have a length of 20 mm." should be -- members have a length of 20-80 mm. --

Claim 4, Line 32, of Column 11 "members have a length of 30 mm." should be -- members have a length of 30-70 mm. --

Claim 9, Line 2, of Column 12 "of lever sets is 3-6." should be -- of lever sets is 3-5. --

Claim 10, Line 12, of Column 12 "of lever sets is 3-5." should be -- of lever sets is 3-4. --

Signed and Sealed this
Twenty-second Day of October, 2024

Katherine Kelly Vidal
*Director of the United States Patent and Trademark Office*